(12) United States Patent
Vogt et al.

(10) Patent No.: US 7,682,674 B2
(45) Date of Patent: Mar. 23, 2010

(54) BADGE- AND BPA-FREE CAN COATING

(75) Inventors: Christian Vogt, Bad Bramstedt (DE); Peter Ambrosi, Husberg (DE); Beate Ries, Kolln-Reisiek (DE)

(73) Assignee: W. R. Grace & Co.-Conn., Columbia, MD (US)

( * ) Notice: Subject to any disclaimer, the term of this patent is extended or adjusted under 35 U.S.C. 154(b) by 92 days.

(21) Appl. No.: 12/116,478

(22) Filed: May 7, 2008

(65) Prior Publication Data

US 2008/0299343 A1 Dec. 4, 2008

Related U.S. Application Data

(63) Continuation of application No. PCT/EP2006/010755, filed on Nov. 9, 2006.

(30) Foreign Application Priority Data

Nov. 29, 2005 (DE) .................... 10 2005 056 959

(51) Int. Cl.
*B32B 15/08* (2006.01)
(52) U.S. Cl. .................... 428/35.8; 428/460; 427/239; 427/372.2; 427/384; 427/388.1; 427/409
(58) Field of Classification Search ................ 428/35.8, 428/460; 427/239, 372.2, 384, 388.1, 409
See application file for complete search history.

(56) References Cited

U.S. PATENT DOCUMENTS

| 4,192,787 A | 3/1980 | Salmon |
| 5,013,589 A | 5/1991 | Schafer et al. |
| 6,217,960 B1 | 4/2001 | Groen in't Woud et al. |

FOREIGN PATENT DOCUMENTS

| GB | 2226 326 | 6/1990 |
| WO | WO 03/022944 | 3/2003 |

OTHER PUBLICATIONS

Form PCT/ISA/210 and 237, Search Report and Written Opinion, PCT/EP2006/010755 dated Jan. 30, 2007, 8 pages.
Form PCT/IPEA/409, International Preliminary Report on Patentability, PCT/EP2006/010755 dated Jan. 17, 2008, 5 pages.

*Primary Examiner*—Michael C Miggins
(74) *Attorney, Agent, or Firm*—Stephen P. Williams; Craig K. Leon

(57) ABSTRACT

The present invention relates to a composition, which is useful for producing coatings for metal sheet substrates of metal cans for storing and/or transporting food or beverages or a lid thereof, and which comprises the following components:
(a) 30 to 90 wt. % of a polyvinylchloride-(PVC)-polymer,
(b) 7 to 25 wt. % of an acrylic resin,
(c) 3 to 40 wt. % of a crosslinking agent, which is produced from phenol, para-tert.-butylphenol, xylenol or a mixture thereof, and formaldehyde,
(d) 0 to 8 wt. % additive,
(e) 0 to 50 wt. % pigment and
(f) a solvent-component,
where all weight percentages are on the basis of the total dry weight of the coating composition (without solvents) and the composition is substantially free of bisphenol-A-diglycidyl-ether ("BADGE") and also substantially free of bisphenol-A-resins. The composition provides metal can coatings that have suitable flexibility, scratch resistance, adherence and sterilization resistance when processed in contact with food. The coatings are suitable for three-piece cans as well as deep-drawn metal cans. In particular they are, however, useful for lids that are to be torn open due to their extraordinary flexibility and sterilization resistance.

18 Claims, No Drawings

BADGE- AND BPA-FREE CAN COATING

This application is a continuation of PCT-Application No. PCT/EP2006/010755, filed Nov. 9, 2006.

BACKGROUND OF THE INVENTION

Metal containers for receiving foods and beverages generally have one or more coatings to prevent contact between the filled product and metal. This is to prevent or minimize corrosion to the metal by the product and any disadvantageous influences on the quality of the product. For producing containers of this type, such as cans of tin-plated or chromium-plated steels or aluminum, metal sheets are used which, prior to their shaping (such as for three-piece can production) or deformation (such as for deep drawing process), are coated with suitable coating compositions. In producing cans for foods and beverages, coatings are required which are extremely flexible and have a low order of toxicity. Furthermore, filled food cans are often sterilized under application of temperatures up to 135° C. The coating must therefore be sufficiently stable at those temperatures an must be capable of adhering to the surface of the metal.

Epoxy phenolic type coatings have been applied as lacquers onto metal can stock (e.g. for three-piece cans) and baked to provide coatings having good resistance to aggressive filled products, mechanical performance and metal adhesion. However, many of these incorporate 2,2'-bis(4-hydroxyphenyl)propane-bis(2,3-epoxypropyl)-ether (or homologues thereof), otherwise known as bisphenol-A-diglycidyl-ether or "BADGE" (Bisphenol-A-Di-Glycidyl-Ether).

The use of BADGE-containing formulations is restricted under food law aspects.

Currently available polyester type coatings, such as those cross-linked with amino-type or isocyanate-type resins, are used on the exterior of three-piece cans, but do not resist processing when in contact with food, or do not comply with food laws, and therefore do not yet provide an alternative coating formulation.

WO 00/55265 describes BADGE-free compositions, which are, however, produced on the basis of polyester resins in combination with bisphenol-A (BPA). Organosoles on the basis of PVC crosslinked with bisphenol-A serve as an alternative to polyester resins. Bisphenol-A was therefore preferably used for the production of sterilization resistant, epoxy-free can coatings. However, it has been found that bisphenol-A acts to the human body in a similar manner as estrogen, which may lead to reproduction disorders.

Crosslinked coating compositions of the polyvinylchloride type are commercially available. However, all known sterilization-resistant coating compositions contain BADGE and/or BPA. The term "cross-links", as used within the context of the present invention, designates covalent bonds linking one polymer chain to another and the term "crosslinking agents" designates monomers or polymers that are able to react or co-react with the polymer chains linking them together to form a duroplastic network.

Many known coating compositions for metal cans also contain metal stabilizers such as lead- or tin-based stabilizers. These metal stabilizers are undesirable in cans for foods and beverages and do not comply with food laws.

Furthermore, in many known coating compositions it is necessary to first apply a primer composition onto the metal surface, before applying the coating composition. This is disadvantageous because a further, costly processing step is required, and because many primer compositions do not comply with food laws.

In view of the foregoing disadvantages of the prior art, a novel can coating is need which is substantially BADGE- and BPA-free.

SUMMARY OF THE INVENTION

In surmounting the disadvantages of the prior art, the present invention provides a composition which is useful for producing coatings for metal sheet substrates, such as metal cans or metal can stock, which is substantially BADGE- and BPA-free.

The present invention further provides a composition which is useful for producing coatings for metal sheet substrates, such as metal cans or metal can stock, and which is useful for application directly onto the metal surface.

According to a further aspect, the present invention provides a composition which is useful for producing coatings for metal sheet substrates, such as metal cans or metal can stock, which is substantially free of metal stabilizers such as lead- or tin-based stabilizers.

The composition according to the present invention provides metal can coatings that have suitable flexibility, scratch resistance, adherence and sterilization resistance when processed in contact with food. The coatings are suitable for three-piece cans as well as deep-drawn metal cans. In particular they are, however, useful for lids that are to be torn open due to their extraordinary flexibility and sterilization resistance. The composition according to the present invention is sufficiently stable at elevated temperatures of up to 135° C., and when processed at extended periods of time of up to 60 minutes at such temperatures. Surprisingly, no pigment is required for achieving this process resistance.

The composition according to the present invention is further useful for direct application onto the metal surface without the need for applying a primer composition.

The objective is solved by a composition, which is useful for producing coatings for metal sheet substrates of metal cans for storing and/or transporting food or beverages or a lid thereof, and which comprises the following components:
(a) 30 to 90 wt. % of a polyvinylchloride-(PVC)-polymer,
(b) 7 to 25 wt. % of an acrylic resin,
(c) 3 to 40 wt. % of a crosslinking agent, which is produced from phenol, para-tert.-butylphenol, xylenol or a mixture thereof, and formaldehyde,
(d) 0 to 8 wt. % additive,
(e) 0 to 50 wt. % pigment and
(f) a solvent-component, where all weight percentages are on the basis of the total dry weight of the coating composition (without solvents) and the composition is substantially free of bisphenol-A-diglycidyl-ether ("BADGE") and also substantially free of bisphenol-A-resins.

The phrase "substantially free", as used within the context of this application, means that the coating compositions of the invention have no BADGE component, or BPA, or at least no more than a de minimus amount of these components, e.g. less than 0.01 wt. %, preferably less than 0.001% by total wt. It is further preferred that the coating components according to the present invention are substantially free of components of the "BADGE-type", such as bisphenol-F-diglycidyl-ether and novolak-diglycidyl-ether. Finally it is preferred that the coating compositions according to the present invention are also substantially free of other epoxy groups.

Further advantages and features of the present invention are discussed hereinafter.

DETAILED DESCRIPTION OF THE INVENTION

All weight percentages provided herein are based on the total dry weight of the coating composition excluding solvent.

The PVC polyer (a) is preferably a PVC homopolymer. Preferred PVC polymers are e.g. available under the trade name GEONS of the series 170 and 190 from PolyOne or under the trade name VINNOLIT® P70 from Vinnolit Kunststoff GmbH. The PVC polymer is used in an amount of from 30 to 90 wt. %, preferably 55 to 80 wt. %

The acrylic resin component (b) is preferably a polymer derived from monomers of the acrylic acid or methacrylic acid type. Furthermore, copolymers or a blend of polymers derived from monomers of the acrylic acid or methacrylic acid type can be used. Preferred are acrylic acid, methylacrylate, ethylacrylate, propylylacrylate, butylacrylate, pentylacrylate, hexylacrylate, metharylic acid, methylmethacrylate, ethylmethacrylate, propylmethacrylate, butylmethacrylate, pentylmethacrylate, hexylmethacrylate resins, copolymer resins of these components or blends thereof. The average molecular weight of the acrylic resin component is preferably greater than 25 000 g/mol, more preferably from 35 000 to 100 000 g/mol, in particular 40 000 to 70 000 g/mol. The glass transition temperature of the acrylic resin component is preferably above 50° C., more preferably between 55 and 75° C. The acid number should preferably be below 20, more preferably below 15. The acrylic resin component is used in an amount of from 7 to 25 wt. %, preferably 7 to 18 wt. %.

The crosslinking component (c) can be characterized as a condensation product, which is produced from a phenol or homologue of phenol (phenol, butlyphenol, cresol, xylenol) and formaldehyde. Preferably the crosslinking component comprises phenol, para-tert.-butylphenol, xylenol or a mixture thereof and formaldehyde. Crosslinking agents which are commercially available and useful according to the present invention are available from Vianova Resins, Germany under the trade name PHENODUR®. Alternatively, amino resins based on urea, melamine, hexamethoxymelamine or benzguanamine and formaldehyde can be used. The crosslinking components can be completely alkylated, partially alkylated or not alkylated.

The crosslinking component is used in an amount of from 3 to 40 wt. %, preferably 8 to 25 wt. %.

Furthermore, additives such as accelerators to control the rate of the crosslinking reaction, lubricants, surfactants, adhesion promoters, stabilizing agents, defoamers, softening agents and the like may be added to the coating composition.

Typical accelerators which may be used are phosphoric acid and its esters and alkylbenzene sulfonic acids, such as dodecylbenzene sulfonic acid, and its esters. They are e.g. used in an amount of from 0 to 3 wt. %, preferably 0.05 to 1.0 wt. % (based on the active substance).

Preferably, the coating composition further comprises a lubricant, which is present in solid state and dispersed in a solvent or is solvated. The lubricant may be present in an amount of from 0.1 to 3 wt. %, more preferably 0.1 to 2 wt. %. Exemplary lubricants may comprise polyethylene (PE), polypropylene (PP), PTFE, lanolin, carnauba wax and petrolatum and have preferably a particle size of less than 25 μm.

The resins can be solvated in a solvent or a solvent mixture. For example, aromatic hydrocarbons such as xylene, ethylene glycol or propylene gylcol ether, acetic acid ester, alcohols such as n-buanol, ketones or other conventional solvents used for can coatings may be used. Preferred solvents that are useful for solvatizing of the acrylic resin and the crosslinking component include aromatic hydrocarbons (e.g. aromatic 100 or aromatic 150), glycolether/glycolether acetate (e.g., methoxypropanol, Butylcellusolve® and its acetate, methoxypropylacetate), alcohols (e.g. isobutanol, diacetone alcohol), ketones (e.g. methylisobutylketone, isophorone) or esters (e.g. butyl acetate, dibasic esters). In other exemplary coating compositions of the invention, at least two different solvents are used, preferably having different boiling ranges.

If desired any commercially available pigment may be used, such as pigments based on aluminum, titanium dioxide or organic pigments. Pigments based on aluminum are preferably used in an amount up to 10 wt. %. Titanium dioxide is preferable used in an amount of up to 50 wt. %. However, the pigment is only present for enhanced appearance. Surprisingly, no pigment is required for achieving the enhanced process resistance.

The coating may be applied to a metal substrate or metal plate for a can, such as by roller coating or spray coating, or it may be applied by these means to a formed can. Preferred application is by roller coating to the flat metal before formation of the can. Preferred coating layer weights are 2 to 15 gsm (grams/square meter), and more preferably 6 to 18 gsm. After application, the coating should be cured at 180° C. to 210° C., and more preferably at 190° C. to 205° C. for 6 to 20 minutes, and more preferably 8 to 13 minutes.

Best Mode

An exemplary can coating composition of the invention may be prepared and applied as follows. A coating batch may be formulated as follows, using a stirring blender:

Preferably, a part of the solvent or solvent mixture is placed into the blender, and then the acrylic resin is added. After the resin is solvatized, preferably PVC-resin is added and dispersed at ambient temperature or elevated temperature. All further components are added step-by-step, whereby the crosslinking agent is preferably present is dissolved form. The additives should be added as solvates or in liquid dispersion.

An exemplary composition has been produced using the following components:

| Preferred Range % (Total dry weight, active substance, resp.) | More Preferred Range % (Total dry weight, active substance, resp.) | Component | Description of the Component |
|---|---|---|---|
| 7-25% | 5-18% | Polyacryl resin | NEOCRYL ® B725 |
| 30-90% | 55-80% | PVC Homopolymer | VINNOLIT ® P70 |
| 3-40% | 8-25% | Crosslinking Agent | PHENODUR ® PR285 |

-continued

| Preferred Range % (Total dry weight, active substance, resp.) | More Preferred Range % (Total dry weight, active substance, resp.) | Component | Description of the Component |
|---|---|---|---|
| 0.1-3.0% | 0.1-2.0% | Lubricant | LANCO WAX ® TF 1780 EF solvatized in solvents |
| 0.01-3.0% | 0.05-1.0% | Accelerator Solvent | NACURE ® 5076 SOLVESSO ® 100, Butylcellusolve ®, DOWANOL ® PMA Ratio 2:1:1 |

Once a homogeneous mixture of the coating components is obtained, this may be coated onto tin-plated steel, chromium-plated steel or aluminum and baked at a temperature of from 150° C. to 250° C., such as about 200° C. for preferably 10 to 20 minutes, more preferably 12 to 15 minutes.

The foregoing discussion is provided by way of illustration only and is not intended to limit the scope of the invention as set forth in the claims.

The invention claimed is:

1. A coating composition, which is useful for coating a metal substrate, which coating composition comprises:
    (a) 30 to 90 wt. % of a polyvinylchloride polymer,
    (b) 7 to 25 wt. % of an acrylic resin,
    (c) 3 to 40 wt. % of a crosslinking agent, which is produced from phenol, para-tert.-butylphenol, xylenol or a mixture thereof, and formaldehyde,
    (d) 0 to 8 wt. % additive,
    (e) 0 to 50 wt. % pigment and
    (f) a solvent-component,
    where all weight percentages are on the basis of the total dry weight of the coating composition (without solvents) and the composition is substantially free of bisphenol-A-diglycidyl-ether ("BADGE") and also substantially free of bisphenol-A-resins and other epoxy groups.

2. The coating composition of claim 1 wherein the acrylic resin is selected from methylmethacrylate, ethylmethacrylate, propylmethacrylate or butylmethacrylate resins or blends thereof.

3. The coating composition of claim 1 wherein the acrylic resin is present in an amount of from 5 to 18 wt. %.

4. The coating composition of claim 1 wherein the crosslinking component is present in an amount of from 8 to 25 wt. %.

5. The coating composition of claim 1 which further comprises additives selected from the group of accelerators for controlling the rate of the crosslinking reaction, lubricants, surfactants, adhesion promoters, stabilizing agents, defoamers, softening agents and mixtures thereof.

6. The coating composition of claim 1 wherein the polyvinylchloride polymer is a polyvinylchloride homopolymer.

7. The coating composition of claim 6 wherein the polyvinylchloride polymer is present in an amount of from 55 to 80 wt. %.

8. The coating composition of claim 1 comprising 55 to 80 wt. % polyvinylchloride polymer, 5 to 18 wt. % acrylic resin, and 8 to 25 wt. % crosslinking agent.

9. The coating composition of claim 8 wherein the polyvinylchloride polymer is a polyvinylchloride photopolymer and wherein the acrylic resin is selected from methylmethacrylate, ethylmethacrylate, propylmethacrylate or butylmethacrylate resins or blends thereof.

10. A method for producing a coated metal substrate which comprises applying a coating composition onto the metal substrate and heating the coated metal substrate, wherein the coating composition comprises:
    (g) 30 to 90 wt. % of a polyvinylchloride polymer,
    (h) 7 to 25 wt. % of an acrylic resin,
    (i) 3 to 40 wt. % of a crosslinking agent, which is produced from phenol, para-tert.-butylphenol, xylenol or a mixture thereof, and formaldehyde,
    (j) 0 to 8 wt. % additive,
    (k) 0 to 50 wt. % pigment and
    (l) a solvent-component,
    where all weight percentages are on the basis of the total dry weight of the coating composition (without solvents) and the composition is substantially free of bisphenol-A-diglycidyl-ether ("BADGE") and also substantially free of bisphenol-A-resins and other epoxy groups.

11. The method of claim 10, wherein the metal substrate comprises tin-plated or chromium-plated steel or aluminum.

12. The method of claim 10 which comprises heating the coated metal substrate for 10 to 20 minutes at a temperature of from 150 to 250° C.

13. The method of claim of claim 10 wherein the coating composition comprises 55 to 80 wt. % polyvinylchloride polymer, 5 to 18 wt. % acrylic resin, and 8 to 25 wt. % crosslinking agent.

14. The method of claim 13 wherein the polyvinylchloride polymer is a polyvinylchloride photopolymer and wherein the acrylic resin is selected from methylmethacrylate, ethylmethacrylate, propylmethacrylate or butylmethacrylate resins or blends thereof.

15. A coated metal substrate, which has been coated with a coating composition comprising:
    (m) 30 to 90 wt. % of a polyvinylchloride polymer,
    (n) 7 to 25 wt. % of an acrylic resin,
    (o) 3 to 40 wt. % of a crosslinking agent, which is produced from phenol, para-tert.-butylphenol, xylenol or a mixture thereof, and formaldehyde,
    (p) 0 to 8 wt. % additive,
    (q) 0 to 50 wt. % pigment and
    (r) a solvent-component,
    where all weight percentages are on the basis of the total dry weight of the coating composition (without solvents) and the composition is substantially free of bisphenol-A-diglycidyl-ether ("BADGE") and also substantially free of bisphenol-A-resins and other epoxy groups.

16. The coated metal substrate of claim 15, characterized in that it is a metal can or can lid intended for storing and/or transporting food or beverages.

17. The coated metal substrate of claim 15 wherein the coating composition comprises 55 to 80 wt. % polyvinylchloride polymer, 5 to 18 wt. % acrylic resin, and 8 to 25 wt. % crosslinking agent.

18. The coated metal substrate of claim 17 wherein the polyvinylchloride polymer is a polyvinylchloride photopolymer and wherein the acrylic resin is selected from methylmethacrylate, ethylmethacrylate, propylmethacrylate or butylmethacrylate resins or blends thereof.

* * * * *